…

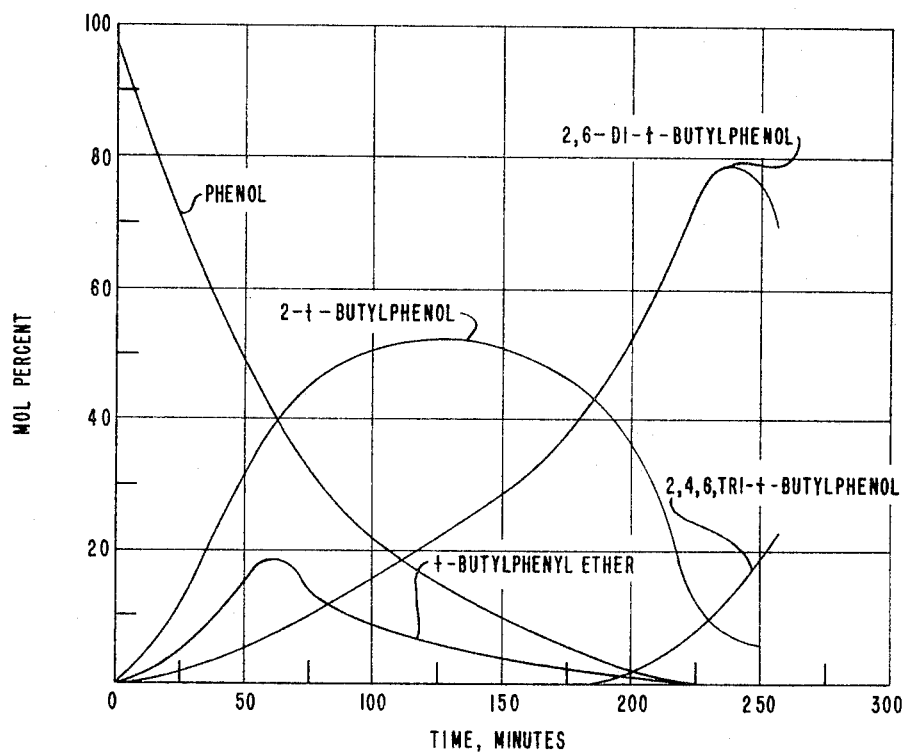

ALKYLATION PROCESS

Klaus L. Mai, Concord, Calif., assignor to Shell Oil Company, New York, N.Y., a corporation of Delaware
Filed Mar. 15, 1962, Ser. No. 179,842
7 Claims. (Cl. 260—624)

This invention relates to the C-alkylation of phenols. More particularly, it relates to a process for selective introduction of an alkyl group into the ring of a phenol and to a new class of materials which will assist in such introduction.

INTRODUCTION

Phenols having hydrocarbon substituents attached to various ring carbon atoms are useful as antioxidants and light stabilizers, as resin intermediates, and for other well-known industrial purposes. As a consequence, a variety of methods for introducing such substituents onto the ring have been devised. In one type of process, the alkylating agent employed is a hydrocarbon halide such as an alkyl halide or aryl halide. Catalysts employed for alkylating phenols with such halohydrocarbons include alkali metal aluminum hydrides, e.g., lithium aluminum hydride, potassium aluminum hydride, such as are taught in U.S. Patent 2,916,532 to L. Schmerling, issued December 8, 1959. Use of aluminum chloride or reaction products thereof to catalyze the reaction between long-chain chlorinated hydrocarbons and phenol is shown in Hathaway's U.S. Patent 2,800,514, issued July 23, 1957; while use of aluminum metal as catalyst in that reaction is shown by Hathaway's U.S. Patent 2,800,515, issued on the same date.

Alkylation with hydrocarbons as alkylating agents has also been extensively practiced. For example, the use of metal phenoxides such as aluminum trisphenoxide or magnesium trisphenoxide to bring about the reaction between olefins and phenols is taught by U.S. Patent 2,831,898 to Ecke, issued April 22, 1958. Use of aluminum chloride in the reaction of olefins with phenols is shown in Buls et al., U.S. 2,923,745, issued February 2, 1960.

OBJECTS

It is an object of the present invention to provide an improved process for the introduction of a hydrocarbon group onto the nuclear ring of a phenol. The provision of such a process employing a mixture of particular ingredients including certain aluminum dialkyl halides is another object. Still another object is the provision of a process for conducting the nuclear alkylation of phenols with olefins under relatively mild conditions and conditions of reduced corrosion is yet another object. The use of new alkylation promoters based on aluminum is yet another object of the invention. Other objects will be apparent from the following detailed description of the invention.

STATEMENT OF THE INVENTION

These objects are accomplished by the process which comprises mixing together a phenol having at least one replaceable hydrogen atom on one of the ring carbon atoms ortho and para to the hydroxyl group; an olefin having up to 12 carbon atoms, in molar excess relative to the phenol; a catalytic amount of aluminum alkyl halide; and no more than about 3.0 millimoles of water per mole of phenol; reacting said mixture under alkylating conditions; and separating the resulting alkylated phenol from the reaction mixture.

The invention can best be understood by considering the materials employed in the process and the manner in which the process is conducted. In the process, the phenol and the olefin are reacted together in the reaction system made up from the components described. One principal advantage of the invention is that the alkylating aluminum promoter compounds are readily soluble in the system and can be handled without the necessity of time-consuming and expensive mixing and dissolution procedures. Another advantage is that by practicing the invention described it is possible to obtain selectively alkylated phenols easily and in high yield. For example, by careful selection of reaction conditions, predominantly ortho- or diortho-substitution is obtained.

PHENOLS

The phenols used in the invention are those compounds having at least one hydroxyl group directly connected to a ring carbon atom of an aromatic nucleus. Typical of such compounds are polynuclear hydrocarbon hydroxyaromatic compounds, such as hydroxyanthracenes, hydroxynaphthalenes, hydroxyphenanthrenes, and the like. The aromatic phenols may be monohydroxy, as in the case of alpha-naphthol or beta-naphthol, or they may be polyhydroxy, as in the case of 1,3-naphthalenediol and 1,5-naphthalenediol, the trihydroxynaphthalenes, and the like. Other types of polyhydroxy polynuclear phenols which may be used in the process are the dihydroxydiphenyls, e.g., p,p'-dihydroxydiphenyl and o,o'-dihydroxydiphenyl; and the dihydroxybisphenyl alkanes, as exemplified by the bis(hydroxyphenyl)methanes, e.g., bis(p-hydroxyphenyl)methane, the bis(hydroxyphenyl)propanes, and similar compounds.

The preferred class of phenols are, however, the mononuclear phenols, such as phenol, hydroquinone, resorcinol, phloroglucinol, pyrogallol, and the like. Of these, the most preferred class are the monohydroxybenzenes, such as m-cresol, o-cresol, p-cresol, the xylenols, o-ethyl phenol, o-tert-butyl phenol, p-tert-butyl phenol, p-octyl phenol, m-amyl phenol and the like. Typical phenols are those having one or more alkyl substituents wherein the alkyl radical may have up to 8 carbon atoms. Such phenols may be those of the structure

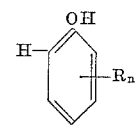

where R is alkyl of up to 8 carbon atoms and $n$ is an integer from 0 to 4. Of these, the preferred embodiment and most preferred reactant is phenol itself, monohydroxybenzene. Because the process of the invention is one which lends itself readily to the o-substitution of these phenols, particularly useful phenols are those wherein there is at least one hydrogen atom on the ring ortho to the hydroxyl group. The ring may also have a hydrogen atom on the ring para to the hydroxyl group, or on the other ortho ring carbon atoms.

The presence of trace amounts of water can be tolerated in the process of the invention. Indeed, as a practical matter, it is both difficult and expensive to employ a completely anhydrous phenol, particularly when practicing the process on an industrial scale. On the other hand, the presence of large amounts of water in the alkylation system has a deleterious effect thereon. As a consequence, it is preferred that no more than about 3.0 millimoles of water per mole of phenol are present in the reaction system, and best results are achieved when the water concentration of the system is as low as about 0.8 to about 1.0 millimole of water on the same basis.

OLEFINS

As the olefinic reactant in the process of the invention, an olefinically unsaturated hydrocarbon is employed. By olefinically unsaturated hydrocarbon is meant a hydrocarbon molecule having at least one carbon-to-carbon olefinically unsaturated non-aromatic linkage. The alkylating agent may be acyclic or cyclic. Exemplary of such compounds are ethylene, propylene, the butylenes, isoprene, cyclohexene, methyl cyclohexene, the amylenes, the butadienes, alpha-methyl styrene, styrene, divinyl benzene, vinyl cyclohexane, and the like. Preferred compounds are those having from 2 to 12 carbon atoms per molecule, for example, dodecene, and most preferred compounds are the monoolefins having up to 5 carbon atoms, e.g., isobutylene, isoamylene. Exemplary olefins are the butenes, pentenes, hexenes, cyclohexenes, heptenes, octenes, nonenes and decenes; the olefinic double bond is most reactive when in the alpha position.

The phenol and the unsaturated hydrocarbon are mixed together in liquid phase under alkylating conditions in the presence of the aluminum alkyl halide. In general, any convenient ratios of reactants may be employed, either a high phenol/hydrocarbon molar ratio or a high hydrocarbon/phenol molar ratio being operative. The preferred range in which the reaction is most effectively conducted is that wherein a substantial molar excess of hydrocarbon is used per mole of phenol. Best results are obtained when the hydrocarbon is in a molar excess from about 2 to about 5 moles of olefin per mole of phenol.

PROMOTER

The phenol and the olefin are reacted together in liquid phase under alkylating conditions in the presence of an aluminum alkyl halide promoter, present in catalytic amount. Such promoters are those aluminum compounds wherein at least one valence is satisfied with an alkyl radical, at least one valence is satisfied with a halogen radical, and the third valence is satisfied with either an alkyl or a halogen radical. These compounds may have the structure $Al(R)(X)_2$ or $Al(R)_2(X)$ where R is alkyl having the above significance and X is halogen.

Such compounds have heretofore been used almost exclusively as catalysts for the production of crystalline polyolefins. Surprisingly, it has now been found that these materials are superior promoters in the alkylation reaction described. Preferred compounds are the chlorides, e.g., the aluminum dialkyl chlorides and aluminum alkyl dichlorides, and particularly those wherein the alkyl radical or radicals have from 2 to 3 carbon atoms. Exemplary of such compounds are diethyl aluminum chlorides, ethyl aluminum dichloride, diisobutyl aluminum chloride, monoisobutyl aluminum dichloride, ethyl diiodoaluminum, diethyl iodoaluminum, and the like. Complex molecules based on these compounds, such as ethyl aluminum sesquichloride, $(Et)_3Al_2Cl_3$, are also effective promoters, as are methyl aluminum sesquichloride and methyl aluminum sesquibromide. Mixtures of such aluminum alkyl halides are, of course, also effective. Preferred catalysts are the aluminum dialkyl halides.

An important advantage of the use of such miscible liquid aluminum promoters is the elimination of the necessity for solid catalyst storage and dissolving facilities. When such solid catalysts as aluminum trichloride are employed, substantial storage, makeup and other handling facilities are required. Furthermore, since the amount of hydrogen halide reaction by-products are minimized, the corrosion and personnel hazards of the process are materially reduced.

Only catalytic amounts of the promoter are required for the conduct of the reaction. While greater or lesser amounts of the aluminum alkyl halide are effective, it has been observed that best results are obained when from about 0.001 to about 0.5 mole of promoter per mole of phenol are employed, while amounts from about 0.005 mole to about 0.10 mole of promoter on the same basis are preferred. The optimal amount of promoter will, of course, depend on the nature of the reactants and of the promoter and on the reaction conditions employed.

In general, the promoter may be introduced into the phenol-hydrocarbon reaction system, or it may be introduced in admixture with either reactant. For example, the aluminum alkyl halide may be premixed with the phenol, and the resulting mixture contacted with the olefin in the reaction zone. The promoters are generally in the form of colorless or light-colored liquids, and are readily mixed and introduced into the phenol-hydrocarbon reaction system, or mixed and introduced with either reactant. For example, the aluminum alkyl halide may be premixed with phenol, and the resulting mixture contacted with the olefin in the reaction zone.

It is a particularly advantageous feature of the invention that the phenol-catalyst mixture formed by reaction of promoter and phenol is stable under storage conditions for prolonged periods. Because of the stability of the phenol-catalyst systems, it is possible to store and ship the catalyst in solution in a phenol, e.g., phenol, and employ the mixture in the alkylation process of the invention.

REACTION CONDITIONS

The phenolic and olefinic reactants are mixed with the aluminum alkyl halide promoter and reacted together under alkylating conditions. By alkylating conditions are meant temperatures and pressures at which substitution of the phenol with the alkylating agent will take place. It is a particular advantage of the invention that, although high temperatures, up to about 300° C. may be employed, temperatures of about 200° C. or less are entirely suitable. The alkylation is slow at temperatures below about 50° C., and a temperature range of about 100–200° C. is preferred, temperatures of 150° C. being effective. Selectivity appears best at these lower temperatures.

The pressure range at which the substitution is conducted is equally mild. The alkylation may be conducted at atmospheric pressure. Since the hydrocarbon alkylating agent may be gaseous, however, it is desirable to employ a pressure sufficient to maintain the agent in the liquid phase at the reaction temperature. Pressures from about 100 p.s.i.g. to about 5000 p.s.i.g. have been found to be adequate for this purpose, while pressures below about 1000 p.s.i.g. are preferred for reasons of convenience. Autogenous pressures, for example, may be used.

The reaction may be conducted in a batch, semi-continuous or continuous manner. One convenient way of conducting the alkylation is to mix the phenol and the promoter, and then add the olefinic hydrocarbon to the resulting mixture. Alternatively, the phenol, olefin and promoter may be simultaneously metered to a reactor for alkylation purposes. The olefin may be added to the phenol incrementally, or it may be added in one rapid addition. The process of the invention is, however, most effective when the phenol is at all times during the alkylation in contact with an excess of olefin. Since the promoters decompose rapidly in air, it is preferred that the addition of the catalyst be conducted under air-free conditions. One convenient mode of insuring an inert atmosphere is to sweep or blanket the reaction system with an inert gas, such as nitrogen, carbon dioxide, helium or the like.

Since the phenol and olefinic hydrocarbon reactant and the alkylated products are liquids or gases at the reaction temperatures, there is no need for a solvent in which to conduct the alkylation. For the purposes of temperature control, however, inert solvents or diluents may be employed if desired. These are preferably such non-reactive high-boiling liquids as the long-chain paraffins, e.g., n-decane, n-nonane, n-undecane, n-hexadecane, and the like.

After the phenol, olefin and promoter have been brought together under reaction conditions, the reaction is allowed to proceed until the desired substituted phenol product is formed in the desired amount. At that point, the reaction is terminated, for example, by stopping the action of the catalyst, so as to prevent isomerization, dealkylation, and production of undesired by-products and polymers. To terminate the reaction, the pressure is reduced, or the reaction system may be cooled, and the reaction mixture treated to inactivate the catalytic species. This may be accomplished by washing the system with water, alcohol or dilute acid, such as hydrochloric or sulfuric acid or with caustic. A 5% aqueous solution of a mineral acid or alkali metal hydroxide is suitable for this purpose.

The reaction products may be separated from the reaction system by such well-known industrial methods as fractional distillation, crystallization or extraction. The phenol and monoalkyl phenol components may conveniently be separated prior to distillation by extraction from the reaction system with caustic, which also serves as noted above, to stop the catalyst action.

PRODUCTS

The process of the invention is particularly suitable for mono- or di-orthoalkylation of phenol or monoalkyl phenols. Thus, phenol and propylene may be reacted together under the conditions described and with added aluminum isobutyl chloride to produce o-isopropyl phenol. The progress of the reaction is readily followed by gas chromatography or similar analytical procedures, and the reaction is readily terminated when the product yield is maximized. Similarly, 2,6-di-tert-amyl phenol is readily prepared in high yield by reacting isoamylene with phenol with added aluminum diethyl chloride. Reaction of o-cresol and isobutylene with added aluminum diisobutyl chloride affords 2-methyl-6-tert-butyl phenol.

Other products which are obtained by the process of the invention include 3-methyl-2,6-diethyl phenol, obtained by alkylation of m-cresol with ethylene; 3-methyl-2,6-diisopropyl phenol, obtained by alkylation of propylene with m-cresol; 2-ethyl-6-tert-butyl phenol, obtained by alkylation of 2-ethyl phenol with isobutylene; 2-isopropylnaphthol-1, obtained by alkylation of naphthol-1 with propylene; 2-decylnaphthol-1, obtained by alkylation of naphthol-1 with decene-1; and 2,5-diisopropylhydroquinone, from alkylation of hydroquinone with propylene.

The novel and improved features of the process of the invention are illustrated by the following examples. It should be understood, however, that the examples are merely illustrative and are not to be regarded as limitations to the appended claims, since the basic teachings thereof may be varied at will as will be understood by one skilled in the art. In the examples, the proportions are expressed in parts by weight unless otherwise noted.

*Example I*

Approximately 35 g. of a 10% w. solution of aluminum diisobutyl chloride in cyclohexane was slowly added to 96 g. of phenol (171 p.p.m. $H_2O$) at 80° C. under nitrogen blanket. After flashing of the cyclohexane and evolution of isobutane ceased, this mixture was charged to a Whitey autoclave and 168 g. of isobutylene pressured in. The mixture was heated to 120° C. and held at this temperature with stirring for approximately 4 hours. The course of the reaction was followed by intermittently sampling the reactor and analyzing by gas chromatography.

A plot of the concentration of component vs. time showed that after 235 minutes, a concentration of ca. 80% m. 2,6-di-tert-butyl phenol existed in the reaction mixture (hydrocarbon-free basis).

| Time, min | 45 | 75 | 105 | 135 | 165 | 195 | 225 | 255 |
|---|---|---|---|---|---|---|---|---|
| Components, mole percent: | | | | | | | | |
| Phenol | 55.9 | 28.5 | 20.2 | 12.8 | 8.1 | 3.2 | 0.6 | 0.2 |
| t-Butyl phenyl ether | 12.6 | 12.4 | 8.3 | 5.2 | 3.8 | 1.4 | 0.2 | |
| 2-t-butylphenol | 26.9 | 45.8 | 50.7 | 51.3 | 49.1 | 38.9 | 8.6 | 4.6 |
| 2-t-butylphenyl-t-butyl ether | 0.8 | 1.6 | 1.7 | 1.8 | 1.7 | 1.3 | 0.5 | 0.4 |
| 2,6-di-t-butylphenol | 3.2 | 10.0 | 16.7 | 25.6 | 33.2 | 49.9 | 76.8 | 70.2 |
| 2,4-di-t-butylphenol | 0.5 | 1.2 | 1.6 | 1.9 | 2.0 | 1.8 | 1.8 | 2.4 |
| 2,4,6-tri-t-butyl phenol | 0.1 | 0.5 | 0.8 | 1.4 | 2.1 | 3.5 | 11.5 | 22.2 |

These data are presented in the figure.

*Example II*

In a second run, approximately 35 g. of a 10% solution of aluminum diisobutyl chloride in cyclohexane was slowly added to 96 g. of phenol (200 p.p.m. $H_2O$) at 150° C. under nitrogen blanket. All of the cyclohexane diluent and isobutane were flashed off. The mixture was then charged to an autoclave and 168 g. of isobutylene pressured in. The mixture was heated to 120° C. and held at this temperature with stirring for approximately 3½ hours. The course of the reaction was followed by intermittently sampling the reactor and analyzing by gas chromatography.

A plot of the concentration of component vs. time showed that after 120 minutes, a concentration of ca. 80% m. 2,6-di-t-butyl phenol existed in the reaction mixture (hydrocarbon-free basis).

| Time, min | 30 | 60 | 92 | 120 | 150 | 180 | 210 |
|---|---|---|---|---|---|---|---|
| Components, mole percent: | | | | | | | |
| Phenol | 55.9 | 31.7 | 16.4 | 9.6 | 3.6 | 0.8 | 0.3 |
| t-Butyl phenyl ether | 25.8 | 15.6 | 7.4 | 4.1 | 1.3 | | 0.1 |
| 2-t-butyl phenol | 17.0 | 42.9 | 52.1 | 49.6 | 41.1 | 5.9 | 4.2 |
| 2-t-butylphenyl t-butyl ether | 0.4 | 1.3 | 1.7 | 1.7 | 1.4 | 0.6 | 0.6 |
| 2,6-di-t-butyl phenol | 0.8 | 7.5 | 20.1 | 31.7 | 48.1 | 79.1 | 73.9 |
| 2,4-di-t-butyl phenol | 0.1 | 0.8 | 1.5 | 1.7 | 1.7 | 1.5 | 1.8 |
| 2,4,6-tri-t-butyl phenol | | 0.2 | 0.8 | 1.6 | 2.8 | 12.1 | 19.1 |

*Example III*

In a third run, approximately 35 g. of a 10% solution of aluminum diisobutyl chloride in cyclohexane was slowly added to 96 g. of phenol (200 p.p.m. $H_2O$) at 100° C. under nitrogen blanket. The temperature was raised to 150° C. to flash off all cyclohexane and isobutane and then the mixture was cooled to 60° C. and held at this temperature for three weeks. Other than a darkening of the solution with age, no physical change, e.g., precipitation or gas evolution, was observed. The phenol-catalyst mixture was then charged to the autoclave and 168 g. of isobutylene pressured in. The mixture was heated to 120° C. and held at this temperature with stirring for approximately 180 minutes. The course of the reaction was followed by intermittently sampling the reactor and GLC (gas-liquid chromatographic) analysis which method of analysis is described, for example, by Stephen Dal Nogare and R. S. Juvet, Jr., in "Gas Liquid Chromatography, Theory and Practice," New York, Wiley.

A plot of the concentration of components vs. time showed that after 160 minutes a concentration of ca.

75% m. 2,6-di-t-butyl phenol existed in the reaction mixture (hydrocarbon-free basis).

| Time, min | 20 | 40 | 60 | 80 | 100 | 120 | 140 | 160 | 180 |
|---|---|---|---|---|---|---|---|---|---|
| Composition, Mole percent: | | | | | | | | | |
| Phenol | 54.7 | 36.9 | 26.0 | 15.6 | 10.7 | 5.7 | 1.6 | 0.4 | 0.5 |
| t-Butyl phenyl ether | 25.3 | 18.7 | 12.6 | 7.3 | 4.3 | 1.8 | 0.3 | 0.2 | 0.2 |
| 2-t-butyl phenol | 18.7 | 38.0 | 47.4 | 52.8 | 50.1 | 42.5 | 16.9 | 5.0 | 4.6 |
| 2-t-butyl phenyl t-butyl ether | 0.4 | 1.1 | 1.6 | 1.7 | 1.6 | 1.3 | 0.7 | 0.3 | 0.6 |
| 2,6-di-t-butyl phenol | 0.8 | 4.6 | 11.0 | 20.2 | 29.7 | 44.1 | 70.8 | 73.3 | 66.8 |
| 2,4-di-t-butyl phenol | 0.1 | 0.5 | 1.0 | 1.5 | 1.8 | 1.9 | 2.0 | 2.4 | 3.1 |
| 2,4,6-tri-t-butyl phenol | Nil | 0.2 | 0.4 | 0.9 | 1.7 | 2.7 | 7.7 | 18.4 | 24.2 |

*Examples IV–X*

Using the methods of the previous examples, the following results are obtained.

| Phenol | Alkylating Agent | Agent/ Phenol, Molar Ratio | Promoter | Mole Promoter per Mole Phenol | Temp., °C. | Pressure, P.s.i.g. | Principal Product |
|---|---|---|---|---|---|---|---|
| Phenol | Ethylene | 5/1 | Ethyl aluminum dichloride | .005 | 150 | 500 | 2,6-diethyl phenol. |
| Do | do | 2/1 | Diethyl aluminum chloride | .010 | 160 | 450 | 2-ethyl phenol. |
| Naphthol-1 | Isobutylene | 2/1 | Ethyl aluminum sesquichloride | .007 | 155 | 550 | 2-t-butyl-naphthol-1. |
| o-Cresol | do | 4/1 | Diisobutyl aluminum bromide | .010 | 155 | 500 | 2-methyl-6-t-butyl phenol. |
| p-Cresol | do | 3/1 | Diethyl aluminum bromide | .010 | 175 | 550 | 2,6-di-t-butyl-4-methyl phenol. |
| Phenol | Cyclohexene | 2/1 | Diisobutyl aluminum chloride | .005 | 155 | 525 | 2,6-dicyclohexyl phenol. |
| Hydroquinone | Isobutylene | 3/1 | do | .015 | 150 | 600 | 2,5-di-tert-butyl hydroquinone. |

I claim as my invention:

1. The process for the ortho-alkylation of a phenol which comprises mixing a mononuclear, monohydroxy carbocyclic phenol having a replaceable hydrogen atom on at least one of the ring carbon atoms ortho to the hydroxyl group, a mono-olefin having up to 5 carbon atoms, and from about 0.001 mole to about 0.5 mole per mole of phenol of an alkyl aluminum halide wherein said alkyl has from 1 to 4 carbon atoms; reacting the resulting substantially homogeneous mixture at a temperature from about 100° C. to about 200° C. and a pressure from about 100 p.s.i.g. to about 5000 p.s.i.g., and separating the resulting ortho-alkylated phenol from the reaction mixture.

2. The process for the ortho-alkylation of phenol, which comprises mixing together phenol, a mono-olefin having up to 5 carbon atoms, and from about 0.001 to about 0.5 mole per mole of phenol of dialkyl aluminum halide wherein said alkyls independently have from 1 to 4 carbon atoms; reacting the resulting substantially homogeneous mixture at a temperature from about 100° C. to about 200° C. and a pressure from about 100 p.s.i.g. to about 5000 p.s.i.g., and separating the resulting ortho-alkylated phenol from the reaction mixture.

3. The process of claim 2 wherein the olefin is isobutylene.

4. The process for the ortho-alkylation of phenol which comprises mixing together phenol, isobutylene in an amount of at least two moles per mole of phenol, and from about 0.001 mole to about 0.5 mole per mole of phenol of dialkyl aluminum chloride wherein said alkyls independently have from 1 to 4 carbon atoms; and reacting the resulting substantially homogeneous solution having no more than about 3.0 millimoles of water per mole of phenol at a temperature from about 100° C. to about 200° C. and a pressure from about 100 p.s.i.g. to about 5000 p.s.i.g., and separating an ortho-tert-butylated phenol from the reaction mixture.

5. The process of claim 4 wherein the aluminum dialkyl chloride is aluminum diisobutyl chloride.

6. The process for the production of 2,6-di-tert-butylphenol which comprises mixing together phenol, isobutylene in an amount of from about 2 to about 5 moles per mole of phenol, and from about 0.001 mole to about 0.5 mole per mole of phenol of dialkyl aluminum chloride wherein the alkyls independently have from 1 to 4 carbon atoms, and reacting the resulting substantially homogeneous mixture at a temperature from about 100° to about 200° C. and a pressure from about 100 p.s.i.g. to about 5000 p.s.i.g., and separating 2,6-di-tert-butylphenol from the reaction mixture.

7. The process of claim 6 wherein the dialkyl aluminum chloride is diethyl aluminum chloride.

References Cited by the Examiner

UNITED STATES PATENTS

| 2,435,087 | 1/1948 | Luten et al. | |
| 2,800,514 | 7/1957 | Hathaway | 260—624 |
| 2,923,745 | 2/1960 | Buls et al. | 260—624 |
| 2,948,763 | 8/1960 | Ashmore | 260—671 |
| 3,185,737 | 5/1965 | Geddes | 260—624 |

LEON ZITVER, *Primary Examiner.*

C. B. PARKER, H. G. MOORE, *Examiners.*

D. R. MAHANAND, W. B. LONE, *Assistant Examiners.*